US006317989B1

(12) United States Patent
Forsberg et al.

(10) Patent No.: US 6,317,989 B1
(45) Date of Patent: Nov. 20, 2001

(54) CHAIN SAW NOSE SPROCKET

(75) Inventors: Karl Erik Forsberg, Jackson; Karl Olov Pettersson, Humboldt; Gabriel Carro, Jackson, all of TN (US)

(73) Assignee: Kapman AB, Sandviken (SE)

( * ) Notice: Subject to any disclaimer, the term of this patent is extended or adjusted under 35 U.S.C. 154(b) by 0 days.

(21) Appl. No.: 09/612,935

(22) Filed: Jul. 10, 2000

(51) Int. Cl.[7] .................................................... B23D 51/02
(52) U.S. Cl. ............................................. 30/384; 474/152
(58) Field of Search ............................ 30/383, 384, 385; 83/820, 830–834; 474/152, 162

(56) References Cited

U.S. PATENT DOCUMENTS 2,351,740 6/1944 Blum .
3,180,378 4/1965 Carlton .
3,261,385 7/1966 Cooper .
3,263,715 * 8/1966 Dobbertin .............................. 30/384
3,683,980 8/1972 Gasner .
4,148,225 * 4/1979 Redmond et al. ................... 474/152
4,754,549 * 7/1988 Fischer et al. .......................... 30/384
4,876,796 * 10/1989 Calkins et al. ..................... 30/384 X
4,970,789 11/1990 Bell .
5,318,483 * 6/1994 Reid et al. ........................... 474/152
5,974,673 * 11/1999 Sundstrom ......................... 30/384 X

* cited by examiner

*Primary Examiner*—Douglas D. Watts
(74) *Attorney, Agent, or Firm*—Burns, Doane, Swecker & Mathis, L.L.P.

(57) ABSTRACT

A nose sprocket for the saw chain of a chain saw includes radially projecting teeth, each tooth having leading and trailing edges. Each of those edges includes a straight inner portion and an outer portion that deviates from a radius of the sprocket by a greater amount than the inner portion. The teeth are long enough to enter a space formed between side links of the saw chain.

15 Claims, 4 Drawing Sheets

*Fig. 1*
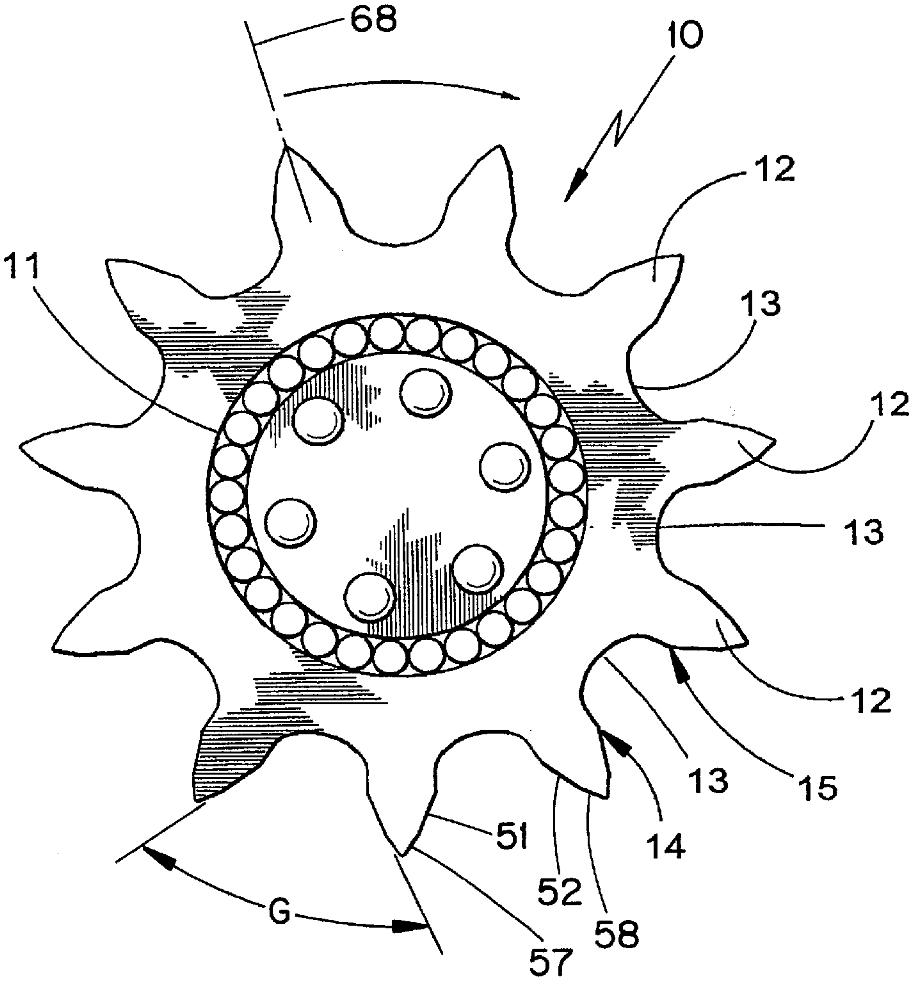
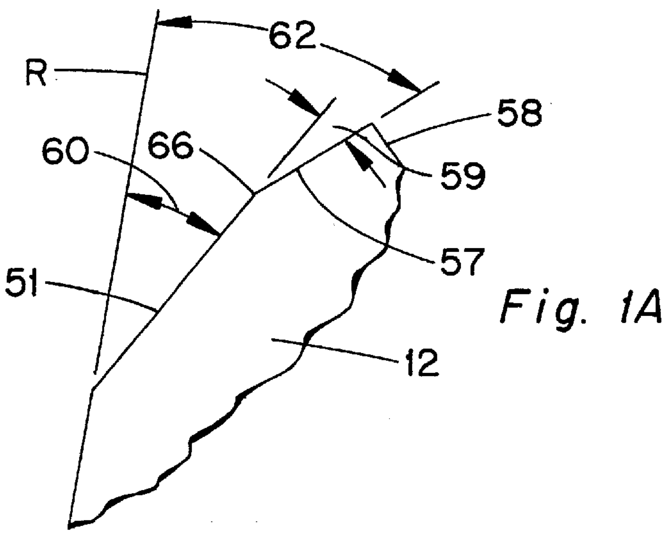
*Fig. 1A*

CHAIN SAW NOSE SPROCKET

BACKGROUND OF THE INVENTION

The present invention relates to chain saws and in particular to the tooth shape of chain saw nose sprockets.

Since the 1950's, saw chains have comprised drive links having a drive tang extending into a groove in a guide bar, and side links on each side of the drive links. Some of the side links are provided with cutter edges and depth gauge projections. The drive tang is approximately triangular, with a cutout at the bottom of its leading edge to catch and convey lubricating oil. Early examples are shown in U.S. Pat. No. 3,180,378, where there is provided a distance between adjacent drive links (still typical for most chain), and in U.S. Pat. No. 3,261,385 where the spacing is much longer.

The chain is powered by a drive sprocket connected to a motor. Since the drive sprocket has a number of teeth which is much less than the number of drive links of the chain, the former being typically 10% of the latter, the drive sprocket teeth will experience much wear. As a drive sprocket wears, its pitch will be reduced. The pitch for a sprocket is defined as the distance between drive links along a chain of a size where every drive link will be fully supported on its leading and trailing edges, and the pitch circle is a circle through the rivet centers of such a chain. When a chain wears, its pitch will increase.

It was early shown in U.S. Pat. No. 2,351,740 that the expected wear of a drive sprocket makes it suitable to start with a sprocket with larger pitch than the chain. That means that most of the tangential force will be carried by the drive link which is about to leave the sprocket. The rest of the chain will be tensioned and its drive links will sequentially extend down into the gullets between the sprocket teeth before they have to carry any tangential force. That is, each drive link will become disposed in a gullet ahead of its respective sprocket tooth before being contacted by that sprocket tooth. This reduces the wear and vibration.

When finally the chain wear causes the chain pitch to be increased so much that it exceeds the sprocket pitch (which has decreased), each of the drive links, at the instant that its tang enters the sprocket gullets, will carry the whole tangential load for a short time until the next drive link enters; the rest of the chain in contact with the sprocket will be without tension and will be prone to vibration. At this point, it is advisable to install a new chain or sprocket.

At the front (nose) of the guide bar is mounted a freely rotatable nose sprocket around which the chain travels, so as to rotate the nose sprocket.

Nose sprockets of the type described in U.S. Pat. No. 3,124,177, were intended to convey the chain around the guide bar nose without any tangential force, and were made with the same pitch as the chains. The nose sprocket teeth were originally made so short that they did not penetrate into a space formed between the side links of the chain, since the undersides of the side links were sometimes beaten and deformed by the drive sprocket teeth to such extent, that the lateral distance between sidelinks was much reduced.

Other types of drive sprockets later reduced this problem, so longer nose sprocket teeth were introduced, but were made rather sharp and with lateral chamfers to ensure that they would enter between the sidel inks. These longer teeth made the chain run more stable around the nose, which was an advantage when making piercing or plunging cuts into the tree trunks. However, longer teeth created problems when the chain pitch was short, as in the case of a new unused chain, and short teeth were again proposed in U.S. Pat. No. 4,970,789.

Having nose sprockets with a pitch equal to or shorter than the chain's nominal pitch has lately been found to be a major cause of sprocket failure in guide bars used for mechanized timber felling or processing. The machines used for mechanized felling normally operate at very high chain speeds and with high chain tension, resulting in high stress in the sprocket, much aggravated by chain wear.

There are several reasons why it is increasingly desirable to accept and adapt to pitch variations of the chain. One is that freshly produced chain normally has minor shape variations such as jarred edges in the rivet holes, which will become smooth after some running time and result in some initial lengthening of the chain. Manufacturers tried to deal with this by a pre-running-in of chain loops for a break-in period before delivery, as a last step in manufacture, but this was a costly and time-consuming procedure.

Some lengthening of the chain during actual use is inevitable, however, due to the wear of rivets and rivet holes. To make it possible to use a chain for as long a time as its cutting edges will last, the nose sprocket will have to accept this variation.

A chain with shorter pitch than the nose sprocket cannot be arranged as a circular (i.e., constant-radius) arc at constant radius around the sprocket, but has to be arranged as a spiral (non constant-radius) arc with one link at a shortest radial distance from the sprocket center, and the others at gradually increasing distances. The link with shortest radial distance will be the only fully supported link. During actual running, this is usually the link that has traveled the whole arc and is about to leave the sprocket, as is shown in U.S. Pat. No. 3,683,980. The trailing links will be supported at their leading edge only. Throughout the arc, the chain will be under relatively constant tension, and the drive link tangs will enter the gullets without impact and gradually slide smoothly down.

A chain with longer pitch than the nose sprocket cannot be arranged with all links supported, either as a circular arc or as a spiral arc. The link about to leave the sprocket will be supported at its leading edge; the link about to enter the sprocket will be supported at its trailing edge; and the intermediate links will be without support. The entering of the link within the sprocket will occur with an impact as the whole chain tension will have to be transferred to the sprocket. The exiting of the link from the sprocket will occur as a sliding motion with high contact pressure during a short time. If continued, this will soon lead to fatigue failure of sprocket or chain. Furthermore, the untensioned intermediate links will be very unstable and may easily cause kickback if they touch the wood as in plunge cutting.

One early attempt to ease the entry of the drive link tangs into the gullets was suggested in U.S. Pat. No. 3,263,715, where the whole contact surface of the tooth was a convex circular arc. This did not make it possible to make the teeth long enough to enter between the sidelinks, however, and the supported position of the links was undetermined since the link tangs had straight edges.

When running an equal or slightly shorter pitch chain over a nose sprocket, the crucial instance is when a link is about to enter the sprocket. When a link is about to settle on the sprocket, the contact point at the leading edge of the link will move along a curve consisting of successive circular arcs centered at successive rivets of links which have already settled, until it touches the tooth. If the tooth contact surface continues straight above the pitch circle, it will ultimately cut this curve which may lead to an impact on the leading edge of the settling link and a temporary increase of the tension force among the settled links. The risk of this is more acute for shorter pitch chain, and in the prior art this set the limit both for how great of a pitch difference could be accepted and how long the teeth could be made.

SUMMARY OF THE INVENTION

The present invention concerns a new tooth shape for nose sprockets, which combines the chain stability previously possible with long teeth, and the insensitivity to pitch variations previously possible with short teeth. It also reduces wear, vibrations and risk of fracture for chain and sprocket.

According to the present invention, the sprocket tooth contact surfaces are straight where they support the drive links, and outwardly of that straight portion the teeth are more steeply tapered, with a short curved transition occurring between the inner and outer portions.

BRIEF DESCRIPTION OF THE DRAWINGS

A preferred embodiment of the invention is described with reference to the figures, wherein:

FIG. 1 shows a preferred nose sprocket according to the invention;

FIG. 1A shows an enlargement of a fragment of a sprocket tooth according to the invention;

DETAILED DESCRIPTION OF A PREFERRED EMBODIMENT OF THE INVENTION

Figure 2:
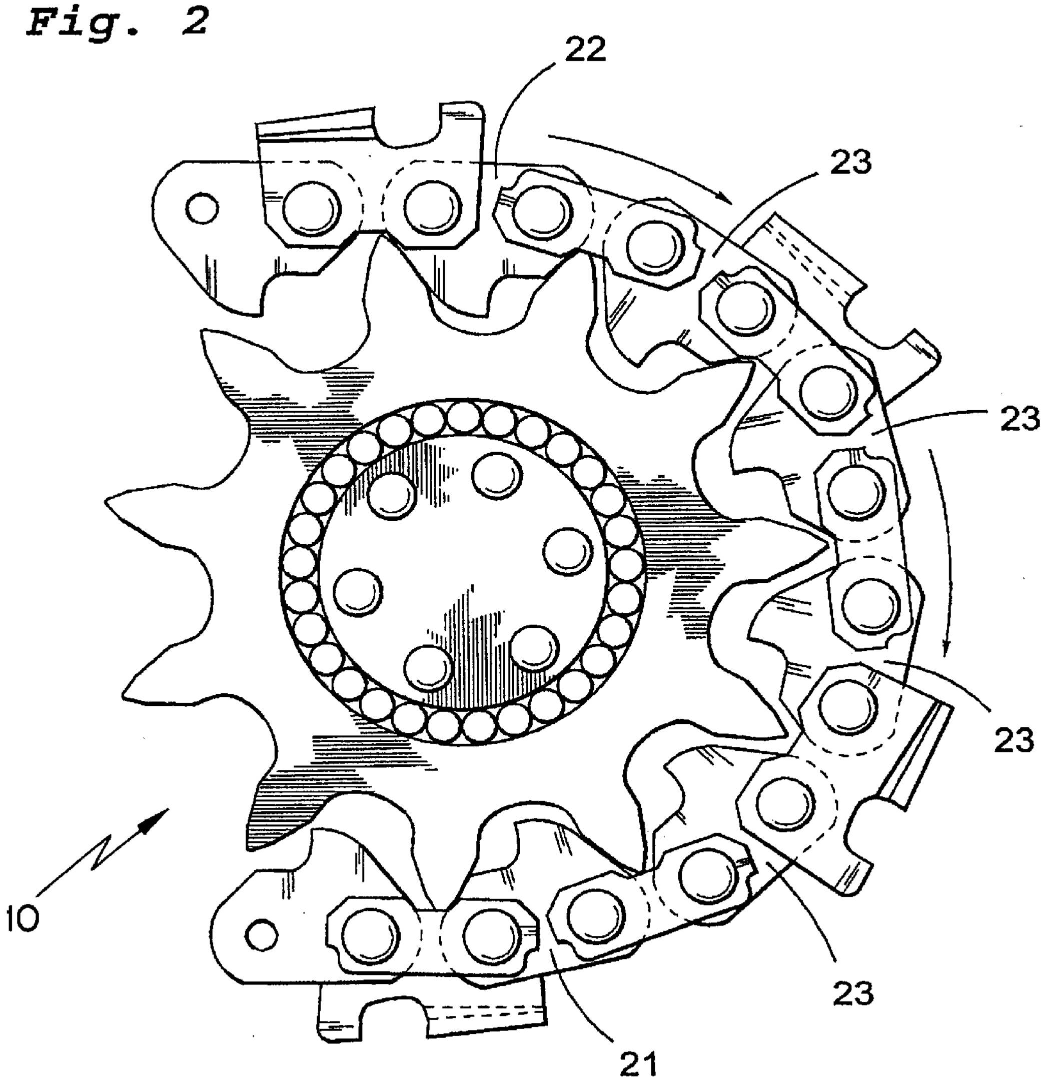
FIG. 2 shows the cooperation between the nose sprocket and a chain with a longer pitch than the sprocket.

A nose sprocket for a chain saw guide bar is made from thin metal to fit between two side plates of a guide bar nose, and is shown in FIG. 1. It has a center hole serving as the outer race (11) of a roller bearing and includes a number of circumferentially spaced teeth (12), usually an odd number, for supporting the saw chain without radial contact with the side plates when the chain travels around the guide bar nose. Between each pair of teeth there is a gullet (13) with a leading gullet side (14) and a trailing gullet side (15) formed by successive teeth. The size of the gullet and the inclination of the gullet sides is chosen to fit the tangs of the drive links. There are, on each gullet side, straight edge portions (51, 57 or 52, 58) to support corresponding straight portions of the drive link tangs. The gullet bottom is rounded or oval, to avoid stress concentrations, and extends deeper than the drive link tangs, to make space for sawdust adhering to the tangs.

If a used chain having a longer pitch than the nose sprocket is being run (hereinafter referred to as a chain with longer pitch), as shown in FIG. 2, a first link (21) about to leave the sprocket will be supported on its leading edge, and a last link (22) which has just reached the sprocket will be supported on its trailing edge. The intermediate links (23) will not be supported by any contact with the sprocket, but rather will be lifted off the sprocket by centrifugal forces. The tension in the straight parts of the chain will be transferred by the sprocket between the first and last links, causing large and variable forces in the sprocket which will lead to fatigue failure. The intermediate links (23) will be so unstable that any contact with the sawn wood will cause kick-back or chain failure. It is thus important that the chain be replaced before it has worn so much that the pitch is too long.

Figure 3:
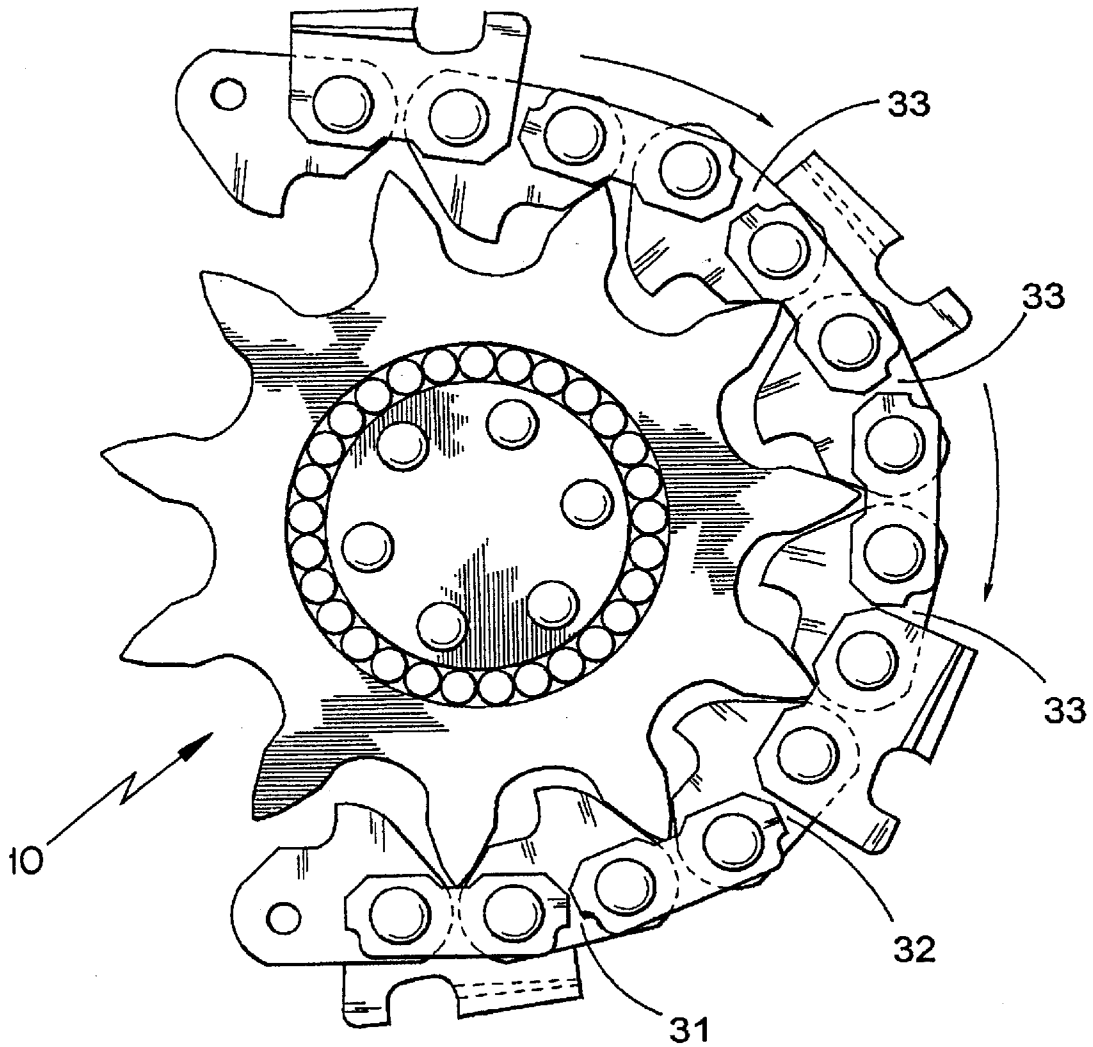
FIG. 3 shows the cooperation between the nose sprocket and a chain with a shorter pitch than the sprocket.

In a chain with shorter pitch than the sprocket is being run, as shown in FIG. 3 (herein referred to as a chain with shorter pitch), the first link (31) which is about to leave the sprocket will be supported on its leading and trailing edges, and the second (32) and every later link (33) will be supported on its leading edge. All links will be under tension and run stably, and the tension will make the later links slide smoothly into the gullets until they are supported on both edges (31) just before they leave the sprocket. There is no restriction against contact with the wood, but as the tension is somewhat increased between the first and second links, there is a limit for how great the pitch difference may be.

Figure 4:
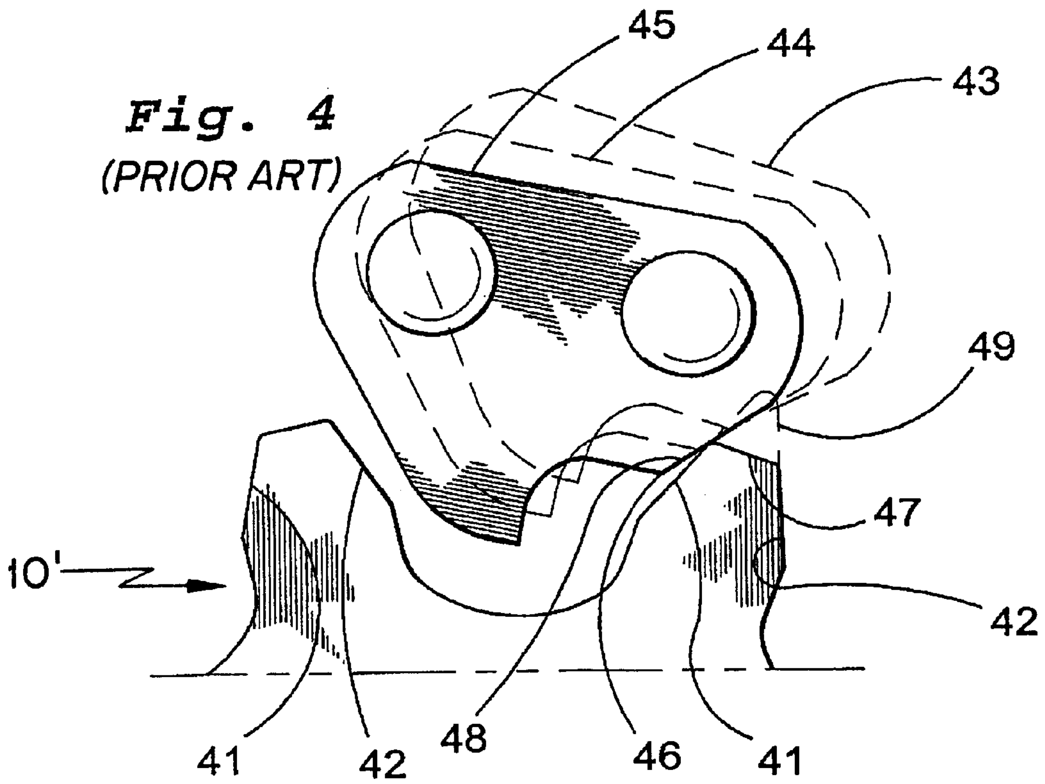
Fig. 4 (PRIOR ART)
FIG. 4 shows a detail of a tooth of a prior art nose sprocket.

In FIG. 4 is shown a detail of a prior art sprocket, with a tooth having straight gullet edges (41, 42) and a low flat top (47). When a drive link of a chain with a slightly shorter pitch (as in FIG. 3) is about to settle onto the sprocket, it will have a series of successive positions (43, 44, 45) relative to the teeth. In an early position (43) the corner (46) of the oil scoop cutout will be above the flat top (47) of the preceding or leading tooth. In a following position (44) the corner (46) will touch the top corner of that tooth defined by the intersection of the flat top (47) and the leading gullet edge (41). In the last position shown (45) the leading edge (48) of the link is about to form an extended contact with the leading gullet edge (41). If the tooth had been longer, e.g., having a tip (49) with edges defined by straight extensions of the gullet support edges (41, 42), the tooth tip would have interfered with the motion of the drive link, and especially the corner (46) would have gotten stuck on the tip (49) and might have made the chain derail.

Figure 5:
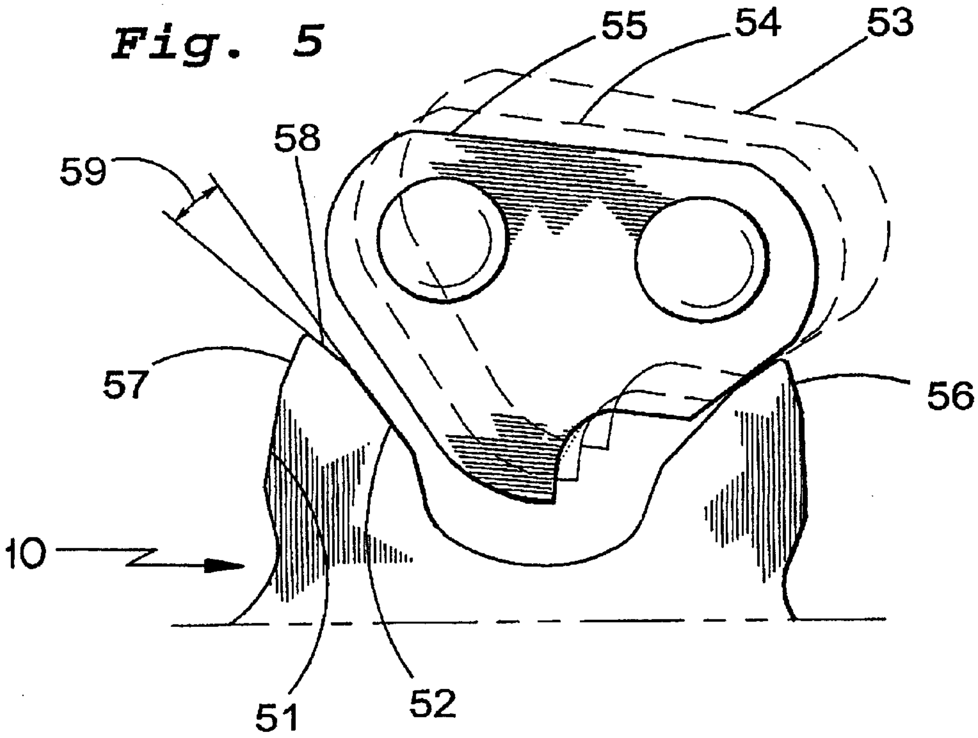
FIG. 5 shows a detail of a tooth of a nose sprocket according to the invention.

FIG. 5 shows a corresponding detail of a sprocket according to the invention, together with the relevant drive links of a chain with slightly shorter pitch. Its teeth have straight inner support edge portions (51, 52) and an extension (56) includes outer edge portions (57, 58) that are more strongly tapered than the inner portions (51, 52). The outer portions (57, 58) are preferably straight and join the respective inner portions (51, 52) by a curved transition 66 (see FIG. 1A). If the taper of the extension (56) is strong enough, the link will slide smoothly against the tooth, with no risk of interfering or derailing. (The teeth according to the prior art had to be made short if they were to accept an even slightly shorter chain pitch, which limited the lateral stability and the possibility to make plunge cuts with the chain saw; if the teeth were instead made longer, then the possibility to run chains with shorter pitch was severely limited, which reduced the usable chain lifetime.)

According to the invention, the sprocket teeth can be made long enough to extend into the space formed between the sidelinks of the chain, thereby improving stability. The teeth are made more strongly tapered above the pitch circle to avoid intersection with the leading edge of the link as the link is settling on the sprocket, to allow safe use of chain with shorter pitch. The actual difference in direction between the straight support edge portions (51, 52) and the straight edge portions (57, 59) of the taper extension (56), i.e., the angle of deviation (59), has to be calculated on the basis of the number of teeth of the sprocket and the gullet angle between the leading and trailing straight sides of the gullet.

The angle of deviation (59) should exceed a value of (540/N−G/2) degrees, where N is the number of teeth and G is the gullet angle. Typical values are N=11 and G=80 degrees indicating that the angle of deviation (59) should exceed 9 degrees for such an eleven-tooth sprocket. For a nine-tooth sprocket the angle (59) should exceed 20 degrees. Preferred values for the angle (59) are approximately 11 degrees for an eleven-tooth sprocket and approximately 23 degrees for a nine-tooth sprocket. In all cases, short convexly rounded transition contour portions (66) between the support edges and the edges of the extension are preferred.

Thus, it will be apparent that the straight inner portion (51 or 52) of each gullet forms an outwardly open acute angle (60) with a radius R of the sprocket (see FIG. 1A), and thus may be considered to deviate from the radius R. The outer portion (57 or 58) deviates from the radius R by a greater amount than the inner portion. That is, if the outer portion (57 or 58) is straight, which is a preferred configuration, it forms a second outwardly open acute angle 62 with the same radius R, the second angle 62 being larger than the first angle 60.

The outer end of each extension (56) can be arbitrarily shaped as flat or rounded, and should preferably be made with lateral chamfers to ensure safe entry between the side links. Although the problem is less severe where the chain links leave the sprocket, it is preferred to make the teeth tapered on both edges to make the sprocket or the guide bar reversible. Each tooth 12 is of symmetrical shape with reference to a radial bisector (68).

By the use of a sprocket with teeth shaped according to the invention, it is possible to use chain with a shorter pitch than the pitch of the socket, e.g., a chain pitch which is at least one percent shorter than the pitch of the sprocket, which was previously possible only with sprockets having short teeth. Thus, with the present invention, long teeth can be used, i.e., teeth which penetrate into the space formed between the side links and thereby maximize lateral stability. (Long teeth having the prior art tooth shapes did not allow such pitch difference.) This allows safe and stable running of a chain with a pitch at least one percent shorter than the pitch of the sprocket, with a corresponding extended lifetime until the chain wear has lengthened the chain so much that it has larger pitch than the sprocket, and has to be replaced for safety reasons.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A chain saw nose sprocket comprising a plurality of teeth spaced circumferentially apart by gullets;

each tooth including first and second edges facing in mutually opposite circumferential directions, wherein leading and trailing sides of each gullet are formed respectively by the first edge of one tooth and the second edge of another tooth;

at least one of the first and second edges of each tooth including radially inner and outer portions adapted to make contact with a drive link of a saw chain, wherein the inner portion being straight and deviating from a radius of the sprocket; the outer portion deviating from that radius by a greater amount than the inner portion.

2. The nose sprocket according to claim 1 wherein at least a portion of the outer portion is straight.

3. The nose sprocket according to claim 2 wherein substantially the entire outer portion is straight.

4. The nose sprocket according to claim 1 wherein the at least one of the first and second edges comprises both of the first and second edges.

5. The nose sprocket according to claim 4 wherein each tooth is symmetrical about a radial bisector of the tooth.

6. The nose sprocket according to claim 1 wherein there are at least eleven teeth and an angle of deviation formed by the inner and outer portions is at least nine degrees.

7. The nose sprocket according to claim 1 wherein there are at least nine teeth and an angle of deviation formed by the inner and outer portions is at least twenty degrees.

8. In combination, a nose sprocket and a saw chain extending therearound;

the saw chain including side links and drive links, the drive links defining a chain pitch;

the sprocket comprising a plurality of teeth spaced circumferentially apart by gullets;

each tooth including first and second edges facing in mutually opposite circumferential directions, wherein leading and trailing sides of each gullet are formed respectively by the first edge of one tooth and the second edge of another tooth;

at least one of the first and second edges of each tooth including radially inner and outer portions adapted to make contact with a drive link of a saw chain, wherein the inner portion being straight and deviating from a radius of the sprocket; the outer portion deviating from that radius by a greater amount than the inner portion, the teeth defining a sprocket pitch which is longer than the chain pitch.

9. The combination according to claim 8 wherein the teeth are long enough to enter a space formed between the side links of the chain.

10. The combination according to claim 9 wherein the chain pitch is at least one percent smaller than the sprocket pitch.

11. The combination according to claim 8 wherein the chain pitch is at least one percent smaller than the sprocket pitch.

12. In combination, a nose sprocket and a saw chain extending therearound; the saw chain comprising side links and drive links; the drive links including respective drive tangs; each drive tang having leading and trailing edges; the drive links defining a chain pitch so small that only one drive tang at a time is supported on both of its leading and trailing edges by the nose sprocket, with all drive tangs disposed on the nose sprocket behind the one sprocket being engaged only at their respective leading edges with the nose sprocket, the nose sprocket comprising a plurality of teeth, each tooth having leading and trailing edges, each of the leading and trailing tooth edges including radially inner and outer portions, the inner portion being straight and deviating from a radius of the sprocket; the outer portion deviating from that radius by a greater amount than the inner portion.

13. The combination according to claim 12 wherein the teeth are long enough to enter a space formed between the side links.

14. The combination according to claim 13 wherein the chain pitch is at least one percent smaller than a pitch defined by the teeth of the nose sprocket.

15. The combination according to claim 12 wherein the chain pitch is at least one percent smaller than a pitch defined by the teeth of the nose sprocket.

* * * * *